United States Patent
Wheeler et al.

(10) Patent No.: US 7,279,032 B2
(45) Date of Patent: Oct. 9, 2007

(54) INKJET INK AND INK SET

(75) Inventors: James Walter Wheeler, West Chester, PA (US); Kuo Hsiung Kung, Wilmington, DE (US); Sandra Laurine Issler, Newark, DE (US); Jose Esteban Valentini, West Chester, PA (US); William Thomas Hall, Hockessin, DE (US)

(73) Assignee: E.I. du Pont de Nemours & Co, Wilimington, DE (US)

( * ) Notice: Subject to any disclaimer, the term of this patent is extended or adjusted under 35 U.S.C. 154(b) by 0 days.

(21) Appl. No.: 11/489,121

(22) Filed: Jul. 19, 2006

(65) Prior Publication Data

US 2007/0058015 A1 Mar. 15, 2007

Related U.S. Application Data

(60) Provisional application No. 60/716,203, filed on Sep. 12, 2005.

(51) Int. Cl.
*C09D 11/02* (2006.01)
*B41J 2/01* (2006.01)

(52) U.S. Cl. .................... 106/31.27; 347/100

(58) Field of Classification Search ............. 106/31.27; 347/100
See application file for complete search history.

(56) References Cited

U.S. PATENT DOCUMENTS

| | | | |
|---|---|---|---|
| 5,085,698 A | 2/1992 | Ma et al. | |
| 5,231,131 A | 7/1993 | Chu et al. | |
| 5,488,402 A | 1/1996 | Shields et al. | |
| 5,518,534 A | 5/1996 | Pearlstine et al. | |
| 5,766,326 A | 6/1998 | Gundlach et al. | |
| 5,888,285 A | 3/1999 | Gundlach et al. | |
| 5,948,154 A * | 9/1999 | Hayashi et al. | 106/31.48 |
| 6,053,969 A | 4/2000 | Lauw et al. | |
| 6,447,592 B1 * | 9/2002 | Taniguchi | 106/31.58 |
| 6,468,337 B1 | 10/2002 | Gundlach et al. | |
| 6,540,821 B2 * | 4/2003 | Adamic et al. | 106/31.48 |
| 6,682,589 B2 * | 1/2004 | Morris et al. | 106/31.48 |
| 6,786,571 B2 * | 9/2004 | Fukumoto et al. | 347/43 |
| 6,852,156 B2 | 2/2005 | Yeh et al. | |
| 6,991,676 B2 * | 1/2006 | Kabalnov et al. | 106/31.48 |
| 7,226,498 B2 * | 6/2007 | Yamashita et al. | 106/31.5 |
| 2006/0048672 A1* | 3/2006 | Sugimoto et al. | 106/31.27 |

FOREIGN PATENT DOCUMENTS

EP 0 556 649 8/1993

* cited by examiner

*Primary Examiner*—Helene Klemanski
(74) *Attorney, Agent, or Firm*—Steven C. Benjamin; Bart E. Lerman

(57) ABSTRACT

The present invention pertains to a yellow ink for inkjet printing and, in particular, to a yellow ink comprising a combination of specific yellow colorants. The present invention further pertains to an ink set comprising this yellow ink. The ink and ink set are particularly advantageous for printing on plain paper.

14 Claims, No Drawings

INKJET INK AND INK SET

CROSS-REFERENCE TO RELATED APPLICATION

This application claims priority under 35 U.S.C. §119 from U.S. Provisional Application Ser. No. 60/716,203, filed Sep. 12, 2005.

BACKGROUND OF THE INVENTION

The present invention pertains to a yellow ink for inkjet printing and, in particular, to a yellow ink comprising a combination of specific yellow colorants. The present invention further pertains to an ink set comprising this yellow ink. The ink and ink set are particularly advantageous for printing on plain paper.

Inkjet printing is a non-impact printing process in which droplets of ink are deposited on a substrate, such as paper, to form the desired image. The droplets are ejected from a printhead in response to electrical signals generated by a microprocessor. Inkjet printers offer low cost, high quality printing and have become a popular alternative to other types of printers.

An ink jet ink set for color printing will generally comprise a cyan, magenta and yellow (CMY) ink, which are referred to as the primary colors. An ink set will also commonly comprise a black ink (CMYK).

A suitable ink should generally exhibit good crusting resistance, good stability, proper viscosity, proper surface tension, good color-to-color bleed alleviation, rapid dry time, consumer-safety and low strike-through.

In addition, the ink set should provide printed images having good color characteristics, such as correct hue and high chroma. Preferably, the ink set will achieve these favorable characteristics on a range of media including plain paper as well as specialty media such as transparency film and coated paper. Also, preferably, the hard copy output is reasonably lightfast.

While some of these conditions may be met by ink vehicle design, other conditions must be met by the proper selection and combination of the colorants. The selection of the colorants becomes especially important when additional limitations are placed on the choice of the colorants because of other system requirements, such as the color-to-color bleed control mechanism.

The term "bleed" means the invasion of one color into another, once the ink is deposited on the print medium. It can be seen as a ragged border between two adjacent colors. The occurrence of bleed is especially problematic between a black ink and color ink because it is all the more visible. Preferably bleed is minimized or eliminated so that borders between colors are clean and sharp.

U.S. Pat. No. 5,488,402 discloses a method for preventing color bleed between two different color ink compositions wherein the first ink is anionic and comprises a coloring agent which includes one or more carboxyl and/or carboxylate groups, and the second ink includes a precipitating agent which is designed to ionically crosslink with the coloring agent in the first ink to form a solid precipitate in order to prevent bleed between the two ink compositions. Multivalent metal salts are disclosed as being useful as the precipitating agent.

U.S. Pat. No. 5,518,534 discloses an ink set for alleviating bleed in multicolor printed elements employing a first ink and a second ink, each containing an aqueous carrier medium and a colorant; the colorant in the first ink being a pigment dispersion and the second ink containing a salt of an organic acid or mineral acid having a solubility of at least 10 parts in 100 parts of water at 25° C., wherein the salt is present in an amount effective to alleviate bleed between the first and second inks.

To take advantage of a bleed control mechanism involving salts, it is necessary to have a set of inks that can provide suitable performance characteristics while maintaining reliability in the presence of those salts. U.S. Pat. No. 6,053,969, for example, discloses an ink set with salt compatibility that addresses these needs. A key aspect of this art is the selection of yellow colorant for the yellow ink in this ink set.

All of the above-identified publications are incorporated by reference herein for all purposes as if fully set forth.

A need still exists for, and it is an objective of this invention to provide, ink sets that can provide the appropriate color, lightfastness and reliability in an environment having a relatively high concentration of inorganic salt bleed control agents.

SUMMARY OF THE INVENTION

In one aspect, this invention pertains to a yellow inkjet ink comprising an aqueous vehicle and a yellow dye colorant substantially soluble in the aqueous vehicle, wherein the yellow dye colorant comprises Acid Yellow 17 (AY17) and a second dye selected from the group consisting of Acid Orange 33 (AO33), Reactive Yellow 181 (RY181) and mixtures thereof.

"Substantially soluble" in the context of the present invention is intended to mean fully soluble, but also includes very minor amounts of components, impurities and the like that may not be entirely soluble in the aqueous vehicle, as would be readily understood by those of ordinary skill in the art. In other words, a "substantially soluble dye" would include generally commercially available forms of the dye that are of a purity suitable for use in the context of the present invention (but may not be 100% pure).

Unless otherwise indicated, dyes are referred to by their "C.I." designation established by Society Dyers and Colourists, Bradford, Yorkshire, UK and published in *The Color Index*, Third Edition, 1971.

In another aspect, the present invention pertains to an inkjet ink set comprising at least two differently colored inks, at least one of which is the yellow ink is as set forth above and as described in more detail below. In one preferred embodiment, the ink set comprises at least three differently colored inks, one of which is the yellow ink, one of which is a magenta ink, and another of which is a cyan ink.

Preferably, the magenta ink comprises an aqueous vehicle (which may be the same as or different from the aqueous vehicle in the yellow and cyan inks) and a magenta dye colorant substantially soluble in the aqueous vehicle, wherein the magenta dye colorant comprises Acid Red 52 (AR52) and a second dye selected from the group consisting of Acid Red 249 (AR249), Acid Red 289 (AR289), Reactive Red 180 (RR180), Reactive Red 23 (RR23), CAS Number 182061-89-8 and mixtures thereof; and Preferably, the cyan ink comprises an aqueous vehicle (which may be the same as or different from the aqueous vehicle in the yellow and magenta inks) and a cyan dye colorant substantially soluble in the aqueous vehicle, wherein the cyan dye colorant comprises a dye selected from the group consisting of Direct Blue 199 (DB 199), Acid Blue 9 (AB9) and mixtures thereof.

In another preferred embodiment, the inkjet ink set comprises an aqueous pigment ink comprising an anionically stabilized pigment dispersed in an aqueous vehicle. The pigment can be an anionically stabilized self-dispersing pigment, but is preferably a pigment dispersed with an anionic polymeric dispersing agent (polymer-dispersed). Preferably, the pigment ink is black and the pigment is a carbon black, more preferably a polymer-dispersed carbon black.

The yellow, cyan and/or magenta inks of the ink set preferably contain bleed control additives, most preferably metal salts, particularly when the ink set comprises an aqueous pigment ink. The metal salts are preferably present at levels sufficient to provide bleed control.

The present invention further includes a method for ink jet printing onto a substrate, comprising the steps of:

(a) providing an ink jet printer that is responsive to digital data signals;

(b) loading the printer with a substrate to be printed;

(c) loading the printer with an inkjet ink or inkjet ink set forth above and as described in further detail below; and (d) printing onto the substrate using the inkjet ink set in response to the digital data signals.

A preferred substrate is plain paper.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION OF THE
PREFERRED EMBODIMENTS

Yellow Ink

In selecting the colorants for the yellow ink and, in general, for the inks of the ink sets of the present invention, numerous factors need to be considered including, but not limited to, appropriate hue angle and color performance, particularly on plain paper; good lightfastness; and compatibility (stability) in formulations having relatively high inorganic salt content.

Of particular importance in the selection of the colorants for the inkjet ink sets of the present invention is the selection of an appropriate colorant for the yellow ink.

The yellow colorant should provide a yellow ink having a hue angle on plain paper of from about 85 to about 100, and preferably between about 88 and about 94. It is desirable that the yellow ink exhibit a chroma of at least about 70 (on plain paper). As evidenced by the Examples hereinafter, yellow inks in accordance with the present invention comprising a mixture of AY17 with one or more of A033 and RY181, exhibit the desired hue angle and chroma, and are compatible with typical levels of metal salts useful for bleed control. The individual dyes AY17, A033 and RY181 further exhibit good lightfastness.

The weight ratio of AY17 to A033 is preferably from about 99:1 to about 90:10, respectively, and the weight ratio of AY 17 to RY 181 is preferably from about 2:1 to about 3:1, respectively, to achieve the desired yellow hue.

The hue angle is determined by standard spectrophotometric measurement by printing an ink onto a plain paper. The hue angle of a specific ink when printed on different plain papers may vary slightly, so the ratio of dyes can be adjusted within the above ranges by routine optimization so as to achieve a hue value within the desired range.

Vehicle

The ink vehicle is the carrier (or medium) for the colorant. An "aqueous vehicle" refers to a vehicle comprised of water or a mixture of water and at least one water-soluble organic solvent (co-solvent) or humectant. Selection of a suitable mixture depends on requirements of the specific application, such as desired surface tension and viscosity, the selected colorant, and compatibility with substrate onto which the ink will be printed.

Examples of water-soluble organic solvents and humectants include: alcohols, ketones, keto-alcohols, ethers and others, such as thiodiglycol, sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether; urea and substituted ureas.

An aqueous vehicle will typically contain about 30% to about 95% water with the balance (i.e., about 70% to about 5%) being the water-soluble solvent. Ink compositions typically contain about 60% to about 95% water, based on the total weight of the aqueous vehicle.

Metal Salt

A metal salt can be incorporated in an ink formulation to help control bleed, and may provide other benefits as well. Use of metal salts in this way has been described, for example, in previously incorporated U.S. Pat. Nos. 5,488,402 and 5,518,534. The salts are referred to in some art as precipitating agents because they are believed to operate by reacting with the anionic groups (such as carboxyl or sulfonate) associated with a colorant (such as a dye, or a self-stabilized pigment, or the anionic group on a dispersant associated with a dispersed pigment) of another ink in the ink set to form an insoluble complex. However, the present invention is not bound by any particular theory of operation.

The metal salt is substantially soluble in the ink vehicle and the metal can be a monovalent or multivalent cation. Suitable metal cations include, for example:

Group IA metals $Na^{+1}$, $Li^{+1}$, $K^{+1}$, $Rb^{+1}$ and $Cs^{+1}$;

Group IIA metals $Mg^{+2}$, $Ca^{+2}$, $Sr^{+2}$ and $Ba^{+2}$;

Group IIIA metals $Al^{+3}$, $Ga^{+3}$ and $In^{+3}$;

transition metals $Cr^{+3}$, $Mn^{+2}$, $Fe^{+2}$, $Fe^{+3}$, $Co^{+3}$, $Ni^{+2}$, $Cu^{+2}$, $Zn^{+2}$, $Y^{+3}$ and $Cd^{+2}$; and Lanthanoid metals $La^{+3}$, $Pr^{+3}$, $Nd^{+3}$, $Sm^{+3}$, $Eu^{+3}$, $Gd^{+2}$, $Tb^{+3}$, $Dy^{+2}$, $Ho^{+3}$, $Er^{+3}$, $Tm^{+3}$, $yb^{+3}$ and $Lu^{+3}$.

Preferred monovalent metal cations include, but are not limited to, $Na^{+1}$ and $K^+$, and preferred multivalent metal cations include, but are not limited to, $Zn^{+2}$, $Mg^{+2}$, $Ca^{+2}$, $Cu^{+2}$, $Ni^{+2}$ and $Fe^{+2}$.

Mixtures of any two or more of metals and metal salts is also suitable.

In the context of the present invention, the amount of salt present is expressed on a metal cation ($M^{+n}$) basis in parts per million (ppm), that is parts by weight of $M^{+n}$ per million weight of ink. The amount of $M^{+n}$ present (total) is generally the range of from about 1000 ppm to about 30,000 ppm and, more typically, from about 2000 ppm to about 20,000 ppm.

Suitable metal salts can be the salt of a mineral or organic acid, the appropriate selection of which is readily achieved through routine experimentation. The mineral acid may be hydrochloric acid, phosphoric acid, sulfuric acid, hydrobromic acid, nitric acid, hydriodic acid, hydrofluoric acid. The organic acids may be carboxylic acids, particularly those carboxylic acids substituted with electron withdrawing groups, and organic sulfonic acids. Some examples of such acids include chloroacetic acid, p-toluene sulfonic acid, sulfanilic acid, benzene sulfonic acid, and so forth.

Additives

Other ingredients (additives) may be formulated into the inkjet ink, to the extent that such other ingredients do not interfere with the stability and jetablity of the finished ink, which may be readily determined by routine experimentation. Such other ingredients are in a general sense well known in the art.

Commonly, surfactants are added to the ink to adjust surface tension and wetting properties. Suitable surfactants include ethoxylated acetylene diols (e.g. Surfynols® series from Air Products), ethoxylated primary (e.g. Tomadol® series from Tomah Products) and secondary (e.g. Tergitol® series from Union Carbide) alcohols, sulfosuccinates (e.g. Aerosol® series from Cytec), organosilicones (e.g. Silwet® series from GE Silicons) and fluoro surfactants (e.g. Zonyl® series from DuPont). Surfactants are typically used in the amount of about 0.01 to about 5% and preferably about 0.2 to about 2%, based on the total weight of the ink.

Polymers may be added to the ink to improve durability. The polymers can be soluble in the vehicle or dispersed (e.g. "emulsion polymer" or "latex"), and can be ionic or nonionic. Useful classes of polymers include acrylics, styrene-acrylics and polyurethanes.

Biocides may be used to inhibit growth of microorganisms. Buffers may be used to maintain pH. Buffers include, for example, tris(hydroxymethyl)-aminomethane ("Trizma" or "Tris").

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2- cyclohexanediaminetetraacetic acid (CyDTA), dethylenetriamine-N,N,N',N", N"-pentaacetic acid (DTPA), and glycoletherdiamine-N,N,N",N"-tetraacetic acid (GEDTA), and salts thereof, may be advantageous, for example, to eliminate deleterious effects of heavy metal impurities.

Proportions of Ingredients

The components described above can be combined to make an ink in various proportions and combinations in order to achieve desired ink properties, as generally described above, and as generally recognized by those of ordinary skill in the art. Some experimentation may be necessary to optimize inks for a particular end use, but such optimization is generally within the ordinary skill in the art.

The amount of vehicle in an ink is typically in the range of from about 70% to about 99.8%, and more typically from about 80% to about 99%. Colorant is generally present in amounts up to about 10%. Percentages are weight percent of the total weight of ink.

Other ingredients (additives), when present, generally comprise less than about 15% by weight, based on the total weight of the ink. Surfactants, when added, are generally in the range of about 0.2 to about 3% by weight based on the total weight of the ink. Polymers can be added as needed, but will generally be less than about 15% by weight based on the total weight of the ink.

Ink Properties

Drop velocity, separation length of the droplets, drop size and stream stability are greatly affected by the surface tension and the viscosity of the ink. Ink jet inks typically have a surface tension in the range of about 20 dyne/cm to about 70 dyne/cm at 25° C. Viscosity can be as high as 30 cP at 25° C., but is typically somewhat lower. The ink has physical properties are adjusted to the ejecting conditions and printhead design. The inks should have excellent storage stability for long periods so as not clog to a significant extent in an ink jet apparatus. Further, the ink should not corrode parts of the ink jet printing device it comes in contact with, and it should be essentially odorless and non-toxic. Preferred pH for the ink is in the range of from about 6.5 to about 8.

Inkjet Ink Set

An inkjet ink set in accordance with the present invention comprises at least two differently colored inks, one of which is the yellow ink as described above. Preferably the ink set comprises at least three differently colored inks (such as CMY), and still more preferably at least four differently colored inks (such as CMYK), wherein at least one of the inks is the yellow ink as described above. In addition to the typical CMYK inks, the ink sets in accordance with the present invention may further comprise one or more "gamut-expanding" inks, including different colored inks such as an orange ink, a green ink, a red ink and/or a blue ink, and combinations of full strength and light strengths inks such as light cyan and light magenta.

The other dye-based inks in the ink set, especially the other colored inks such as cyan and magenta, are preferably chromatic, suitably lightfast and stable to inorganic salts.

The other dye-based inks in the ink set comprise an aqueous vehicle as described above and a dye colorant of a desired color substantially soluble in the aqueous vehicle. Optional other components and ink properties are of a similar nature to those of the yellow ink as described above.

The magenta ink preferably comprises mixture of AR 52 and a second magenta dye selected from the group consisting of AR249, AR289, RR180, RR23, CAS Number 182061-89-8 and mixtures thereof. Most preferred as the second magenta dye are AR249 and CAS Number 182061-89-8.

CAS Number 182061-89-8 is commercially available from Ilford Imaging Group (Ilford M377). The structure of CAS Number 182061-89-8 can be seen from Magenta Formula II in previously incorporated U.S. Pat. No. 6,053,969.

The weight ratio of AR52 to the second magenta dye required to achieve a desirable magenta hue is generally from about 1:3 to about 1:8, respectively, when the second dye is either AR249 or CAS Number 182061-89-8.

The cyan ink preferably comprises a cyan dye selected from the group consisting of DB 199, AB9 and mixtures thereof.

The yellow ink of the present invention, and each of the dye-based inks of the inks sets of the present invention, typically have a dye content from about 0.1 wt % to about 8 wt % and, more typically, from about 0.5 wt % to about 6 wt %, based on the total weight of the ink. The "dye content" in a given ink refers the total dye present in that ink, whether a single dye species or a combination of two or more dye species.

The dyes are usually in their salt form, such as an alkali metal (Na, K, or Li) or quaternary ammonium salt. Most commonly, the commercially available salt form is sodium. Other salt forms can be made using well-known techniques.

The ink set may further comprise a pigmented ink, more preferably a pigmented ink based on an anionically-stabilized pigment dispersion. The pigment colorant will generally be designed to "crash" on contact with the metal salts in the dye-based colored inks and thereby resist bleeding into the colored areas.

The aqueous anionic pigment ink comprises an aqueous vehicle, an insoluble colorant (pigment) stably dispersed therein and, optionally, well-known types of other ingredients (additives) such as described above. The pigment can be any suitable pigment but, when employed in an ink set according to the present invention, will generally be a black pigment, preferably carbon black.

Pigments, traditionally, are stabilized to dispersion in a vehicle by dispersing agents, such as polymeric dispersants or surfactants. More recently though, so-called "self-dispersible" or "self-dispersing" pigments (hereafter "SDP(s)") have been developed. As the name would imply, SDPs are dispersible in water, or aqueous vehicle, without dispersants. Thus, pigment may be stabilized to dispersion by surface treatment to be self-dispersing (see, for example, U.S. Pat. No. 6,852,156, the disclosure of which is incorporated by reference herein for all purposes as if fully set forth), by treatment with dispersant in the traditional way, or by some combination of surface treatment and dispersant.

Preferably, when dispersant is employed, the dispersant(s) is a random or structured polymeric dispersant. Preferred random polymers include acrylic polymer and styrene-acrylic polymers. Most preferred are structured dispersants which include AB, BAB and ABC block copolymers, branched polymers and graft polymers. Some useful structured polymers are disclosed in U.S. Pat. No. 5,085,698, EP-A-0556649 and U.S. Pat. No. 5,231,131 (the disclosures of which are incorporated by reference herein for all purposes as if fully set forth).

The dispersant or surface treatment applied to the pigment creates an anionic surface charge ("anionic pigment dispersion"). Preferably, that surface charge is imparted predominately by ionizable carboxylic acid (carboxylate) groups.

Useful pigment particle size is typically in the range of from about 0.005 micron to about 15 micron. Preferably, the pigment particle size should range from about 0.005 to about 5 micron, more preferably from about 0.005 to about 1 micron, and most preferably from about 0.005 to about 0.3 micron.

Method of Printing

The inks and ink sets of the present invention can be printed with any suitable inkjet printer. The substrate can be any suitable substrate, but the instant invention is particularly useful for printing on paper, and more especially, "plain" paper. Plain paper is generally less expensive than "inkjet" paper and typically lacks any special additives that enhance print properties such as bleed control bleed. But even within the plain paper category there are differences in performance with regard to bleed. The benefits of the performance additives will be most evident on papers with the greatest tendency to bleed. The present invention allows good quality prints to be obtained independent of the paper chosen. Examples of plain paper commonly available are Xerox 4024 (Xerox Corporation) and Hammermill Copy Plus (International Paper).

EXAMPLES

Inks were prepared by mixing the indicated ingredients together and filtering the resulting solution. Water was deionized unless otherwise stated. The dyes used were "inkjet grade" meaning that they were relatively pure and free of extraneous salts. The amount of salt introduced by the dyes was minimal, and the salt level in the finished inks comes predominately from any deliberately added salt. In commercial operation, however, extraneous salt commonly found in dyes may not need to be removed and could be part of the overall salt content.

Example 1 (Comparative)

For comparison to the present invention reference is made to Table III in previously incorporated U.S. Pat. No. 6,053,969. That table illustrates the problems with various dye colorants commonly mentioned for inkjet use. For example, DY132 has favorable hue angle, chroma and lightfastness, but is incompatible with precipitating agents (inorganic salts). DY86 has favorable, chroma and lightfastness, but a lower than desired hue angle and no compatibility with precipitating agents. AY23 has favorable hue angle, chroma and compatibility with precipitating agents, but poor lightfastness. AY17 has favorable chroma, lightfastness and compatibility with precipitating agents, but higher than desired hue angle. Yellow dye of formula I has favorable chroma, lightfastness and compatibility with precipitating agents, but lower than desired hue angle. However, a yellow ink with a combination of AY17 and Yellow Dye of Formula I (the key feature of previously U.S. Pat. No. 6,053,969) achieves all the target attributes, namely a hue angle of 90-95, plain paper chroma of at least 70, good lightfastness and compatibility with inorganic salts.

Example 2

Ink 2a (comparative) was formulated with the colorant combination AY17 and Ilford Y104 (Ilford Imaging Group). Ilford Y104 (CAS Number 187674-70-0) corresponds to "Yellow Formula I" in previously incorporated U.S. Pat. No. 6,053,969. Ink 2b (inventive) was formulated with a combination of AY17 (4.2 wt %) and AO33 (0.22 wt %). Ink 2c (inventive) was formulated with a combination of AY17 (3.0 wt %) and RY181 (1.2 wt %). The amount of each dye, noted in parenthesis, is weight percent of dye based on the total weight of ink.

Inks were printed at full density onto Xerox 4024 plain paper with a Hewlett Packard Photosmart 7760 inkjet printer operated the "normal" mode. Color measurements were made with a commercially available spectrophotometer, in this case a Spectroeye from Gretag-MacBeth. Hue ($h_{ab}$) and chroma ($C^*_{ab}$) values are read directly from the instrument but are based on CIELAB colorspace L*, a* and b* terms according to the following equations: $h_{ab}=\tan^{-1}(b^*/a^*)$ where the angle is adjusted for the appropriate quadrant and $C^*_{ab}=(a^{*2}+b^{*2})^{1/2}$. The measurements and definitions are well known in the art, see for example ASTM Standard E308 and *Principles of Color Technology,* Billmeyer and Saltzman, 3rd Ed., Roy Berns editor, John Wiley & Sons, Inc. (2000).

| Yellow Ink | Hue angle | Chroma | Metal salt Compatibility |
|---|---|---|---|
| Ink 2a - Comp. (AY17 + Ilford Y104) | 90 | 70 | Compatible |
| Ink 2b (AY17 + AO33) | 90 | 67 | Compatible |
| Ink 2c (AY17 + RY181) | 90 | 71.6 | Compatible |

The inventive colorant combinations employed in ink 2b and 2c are seen to have favorable hue angle and chroma, similar to the prior art colorant combination represented by Ink 2a and used here for comparison.

Also the inventive ink colorants were compatible with salt.

The invention claimed is:

1. A yellow inkjet ink comprising an aqueous vehicle and a yellow dye colorant substantially soluble in the aqueous vehicle, wherein the yellow dye colorant comprises Acid Yellow 17 and a second dye selected from the group consisting of Acid Orange 33, Reactive Yellow 181 and mixtures thereof.

2. The ink of claim 1, wherein the dye colorant comprises Acid Yellow 17 and Acid Orange 33.

3. The ink of claim 2, wherein the weight ratio of Acid Yellow 17 to Acid Orange is from about 99:1 to about 90:10.

4. The ink of claim 1, wherein the dye colorant comprises Acid Yellow 17 and Reactive Yellow 181.

5. The ink of claim 4, wherein the weight ratio of Acid Yellow 17 to Reactive Yellow 181 is from about 2:1 to about 3:1.

6. The ink of any of claims 1-5, further comprising a metal salt.

7. The ink of any of claims 1-6, having a hue angle of from about 85 to about 100.

8. The ink of claim 7, having a hue angle of from about 88 to about 94.

9. An inkjet ink set comprising at least two differently colored inks, wherein one of the inks is the yellow ink as set forth in any one of claims 1-8.

10. The inkjet ink set of claim 9, comprising the yellow ink, a magenta ink and a cyan ink, wherein:

the magenta ink comprises an aqueous vehicle and a magenta dye colorant substantially soluble in the aqueous vehicle, wherein the magenta dye colorant comprises Acid Red 52 and a second dye selected from the group consisting of AR249, AR289, RR180, RR23, M377 and mixtures thereof; and the cyan ink comprises an aqueous vehicle and a cyan dye colorant substantially soluble in the aqueous vehicle, wherein the cyan dye colorant comprises a dye selected from the group consisting of Direct Blue 199, Acid Blue 9 and mixtures thereof.

11. The inkjet ink set of claim 10, wherein the magenta dye colorant ink comprises Acid Red 52 and a second dye selected from the group consisting of AR249, CAS Number M377 and mixtures thereof.

12. A method for ink jet printing onto a substrate, comprising the steps of:

(a) providing an ink jet printer that is responsive to digital data signals;

(b) loading the printer with a substrate to be printed;

(c) loading the printer with an inkjet ink as set forth in claim 1; and (d) printing onto the substrate using the inkjet ink in response to the digital data signals.

13. The method of claim 12, wherein the substrate is plain paper.

14. A method for ink jet printing onto a substrate, comprising the steps of:

(a) providing an ink jet printer that is responsive to digital data signals;

(b) loading the printer with a substrate to be printed;

(c) loading the printer with an inkjet ink set as set forth in claim 9; and (d) printing onto the substrate using the inkjet ink set in response to the digital data signals.

* * * * *